(12) United States Patent
Haas (10) Patent No.: US 7,657,750 B2
(45) Date of Patent: Feb. 2, 2010

(54) WATERMARKING METHOD WITH PRINT-SCAN COMPENSATION

(75) Inventor: Bertrand Haas, New Haven, CT (US)

(73) Assignee: Pitney Bowes Inc., Stamford, CT (US)

(*) Notice: Subject to any disclaimer, the term of this patent is extended or adjusted under 35 U.S.C. 154(b) by 1153 days.

(21) Appl. No.: 10/720,503

(22) Filed: Nov. 24, 2003

(65) Prior Publication Data

US 2005/0114667 A1 May 26, 2005

(51) Int. Cl.
*G06T 5/00* (2006.01)
*G06Q 50/00* (2006.01)

(52) U.S. Cl. ............ 713/176; 358/3.28; 358/3.26; 283/113; 705/62

(58) Field of Classification Search ............ 705/62; 358/3.26, 3.28; 713/176
See application file for complete search history.

(56) References Cited

U.S. PATENT DOCUMENTS

| | | | |
|---|---|---|---|
| 4,910,460 A | 3/1990 | Sebok | |
| 5,271,096 A * | 12/1993 | Cook | 345/604 |
| 5,813,771 A * | 9/1998 | Ur et al. | 400/74 |
| 5,825,892 A | 10/1998 | Braudaway et al. | |
| 6,185,312 B1 | 2/2001 | Nakamura et al. | 382/100 |
| 6,317,115 B1 | 11/2001 | Yokomizo et al. | |
| 6,332,030 B1 | 12/2001 | Manjunath et al. | 382/100 |
| 6,332,194 B1 | 12/2001 | Bloom et al. | |
| 6,385,329 B1 | 5/2002 | Sharma et al. | 382/100 |
| 6,701,304 B2 * | 3/2004 | Leon | 705/401 |
| 6,711,276 B1 | 3/2004 | Yoshiura et al. | 382/100 |
| 6,728,408 B1 | 4/2004 | Echizen et al. | 382/232 |
| 6,804,379 B2 | 10/2004 | Rhoads et al. | 382/101 |
| 6,823,455 B1 | 11/2004 | Macy et al. | 713/176 |
| 6,938,017 B2 * | 8/2005 | Yen et al. | 705/62 |
| 6,978,035 B2 * | 12/2005 | Kawaguchi et al. | 382/100 |
| 6,993,151 B2 | 1/2006 | Tsai et al. | 382/100 |
| 7,065,237 B2 | 6/2006 | Murakami | 382/137 |
| 7,424,169 B2 * | 9/2008 | Viassolo et al. | 382/274 |
| 7,519,819 B2 * | 4/2009 | Bradley et al. | 713/176 |
| 2001/0040979 A1 | 11/2001 | Davidson et al. | |
| 2002/0012445 A1 * | 1/2002 | Perry | 382/100 |
| 2002/0076081 A1 * | 6/2002 | Rhoads | 382/100 |
| 2002/0126870 A1 | 9/2002 | Wendt | 382/100 |

(Continued)

FOREIGN PATENT DOCUMENTS

WO 03/012727 A1 2/2003

OTHER PUBLICATIONS

Sven Behnke, "A Two-Stage System For Meter Value Recognition", Sep. 2003, Proceedings of IEEE International Conference on Image Processing (ICIP), Barcelona, Spain, pp. 549-552.*

(Continued)

*Primary Examiner*—Matthew T Henning
(74) *Attorney, Agent, or Firm*—Ronald Reichman; Angelo N. Chaclas (57) ABSTRACT

A digital watermark may be applied to digital image data to produce watermarked digital image data. A transformation may be applied to the watermarked digital image data to produce transformed watermarked digital image data. The transformation may approximate the inverse of a transformation that represents distortion caused by transmission through a print-scan channel.

3 Claims, 7 Drawing Sheets

U.S. PATENT DOCUMENTS

| | | | |
|---|---|---|---|
| 2002/0157005 A1 | 10/2002 | Brunk et al. | 713/176 |
| 2002/0176114 A1 | 11/2002 | Zeller et al. | 358/3.28 |
| 2003/0026453 A1 | 2/2003 | Sharma et al. | 382/100 |
| 2003/0053653 A1 | 3/2003 | Rhoads | |
| 2003/0105730 A1* | 6/2003 | Rhoads et al. | 705/407 |
| 2003/0130954 A1* | 7/2003 | Carr et al. | 705/60 |
| 2003/0156733 A1* | 8/2003 | Zeller et al. | 382/100 |
| 2003/0159046 A1 | 8/2003 | Choi et al. | 713/176 |
| 2003/0175602 A1* | 9/2003 | Kazama | 430/22 |
| 2003/0215112 A1 | 11/2003 | Rhoads et al. | 382/100 |
| 2004/0030899 A1 | 2/2004 | Lee | 713/176 |
| 2004/0105569 A1 | 6/2004 | Sharma et al. | 382/100 |
| 2004/0153649 A1 | 8/2004 | Rhoads et al. | 713/176 |
| 2004/0187004 A1* | 9/2004 | Ray et al. | 713/176 |
| 2004/0236951 A1 | 11/2004 | Zhao | 713/179 |
| 2005/0114668 A1 | 5/2005 | Haas et al. | 713/176 |
| 2006/0045306 A1 | 3/2006 | Cordery et al. | 382/100 |

OTHER PUBLICATIONS

J.D. Tygar, B.S. Yee, N. Heintze. "Designing Cryptographic Postage Indicia." Proceedings of ASIAN '96. Singapore, Dec. 1996.*

Lefebvre, F.; Gueluy, A.; Delannay, D.; Macq. B., "A print and scan optimized watermarking scheme," Multimedia Signal Processing, 2001 IEEE Fourth Workshop on , vol., no., pp. 511-516, 2001.*

* cited by examiner

WATERMARKING METHOD WITH PRINT-SCAN COMPENSATION

CROSS REFERENCE TO RELATED APPLICATIONS

Reference is made to commonly assigned copending patent application, filed herewith entitled "Fragile Watermark for Detecting Printed Image Copies in the names of Bertrand Haas, Robert A. Cordery and Claude Zeller; and filed herewith entitled "Detecting Printed Image Copies Using Phase-Space-Encoded Fragile Watermark" in the names of Robert A. Cordery, Claude Zeller and Bertrand Haas.

BACKGROUND

This invention relates generally to the field of printed document security, and more particularly to image data processing for the purpose of watermarking printed images.

It has been proposed to include watermark data in digital image data so that resulting printed images contain watermarks. The purpose of the watermarks may be to authenticate the printed images. That is, for example, fragile watermarks may be placed in original images to allow copies to be distinguished from originals; or robust watermarks may be placed in original images to allow the source of first or later generation copies to be ascertained. However, the process of printing an image and then scanning the printed image to retrieve the watermark results in scanned image data that is distorted relative to the original image data used in generating the printed image. This distortion in the "channel" by which the scanned image data is obtained from the original image data may compromise detection or other processing applied to the watermark in the scanned image data.

SUMMARY

Accordingly, methods are provided for transforming data used to print images so as to improve the quality of the watermark in the printed image.

In one aspect, a method includes providing digital image data that represents an image. A digital watermark is applied to the digital image data to produce watermarked digital image data. A transformation is applied to the watermarked digital image data to produce transformed watermarked digital image data. The transformation is at least approximately an inverse of a print-scan distortion transformation. As used herein and in the appended claims, a "print-scan distortion transformation" refers to a mapping or other operation that digitally approximates the effect (other than random noise) on first image data of printing an image with the first image data and then scanning the resulting printed image to produce second image data.

The print-scan distortion transformation may be applied to the digital image data prior to the step of applying the digital watermark to the digital image data.

An image may be printed on the basis of the transformed watermarked digital image data and the printed image may be scanned to produce scanned image data. The scanned image data may be analyzed to retrieve the watermark in the scanned image data. The printing of the image may be performed by a postage meter in which the transformed watermarked digital image data has been loaded.

In another aspect, a method includes providing watermark data that represents a digital watermark and applying a transformation to the watermark data to produce transformed watermark data. The transformation is at least approximately an inverse of a print-scan distortion transformation. The method further includes providing digital image data that represents an image and combining the transformed watermark data with the digital image data to produce watermarked digital image data.

An image may be printed on the basis of the watermarked digital image data and the printed image may be scanned to produce scanned image data. The scanned image data may be analyzed to retrieve the watermark in the scanned image data. The printing of the image may be performed by a postage meter in which the watermarked digital image data has been loaded.

By inverse-transforming watermark data, or inverse-transforming image data that has been watermarked, the watermark may, in effect, pass through the print-scan channel with reduced distortion, which may promote improved detection or facilitate other processing of the watermark.

In still another aspect, a method includes providing image data that represents an image and applying a digital watermark to the digital image data to produce watermarked digital image data. A print-scan distortion transformation is applied to the watermarked digital image data to produce transformed watermarked digital image data. A characteristic of the watermark as represented by the transformed watermarked digital image data is retrieved. The method further includes printing an image on the basis of the watermarked digital image data and scanning the printed image to produce scanned image data. A characteristic of the watermark as represented by the scanned image data is retrieved. A comparison is made of the watermark characteristics as the watermark is respectively represented by the transformed watermarked digital image data and by the scanned image data.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

In the method of the present invention, a transformation that is substantially or approximately the inverse of a print-scan distortion transformation is applied to watermarked image data, or to watermark data prior to combining the watermark data with image data. The transformation applied to the watermarked image data or to the watermark data pre-compensates for distortion that will occur in the watermark during printing followed by scanning of the printed image. Detection or other processing of the watermark from the scanned image data is improved.

Figure 1:
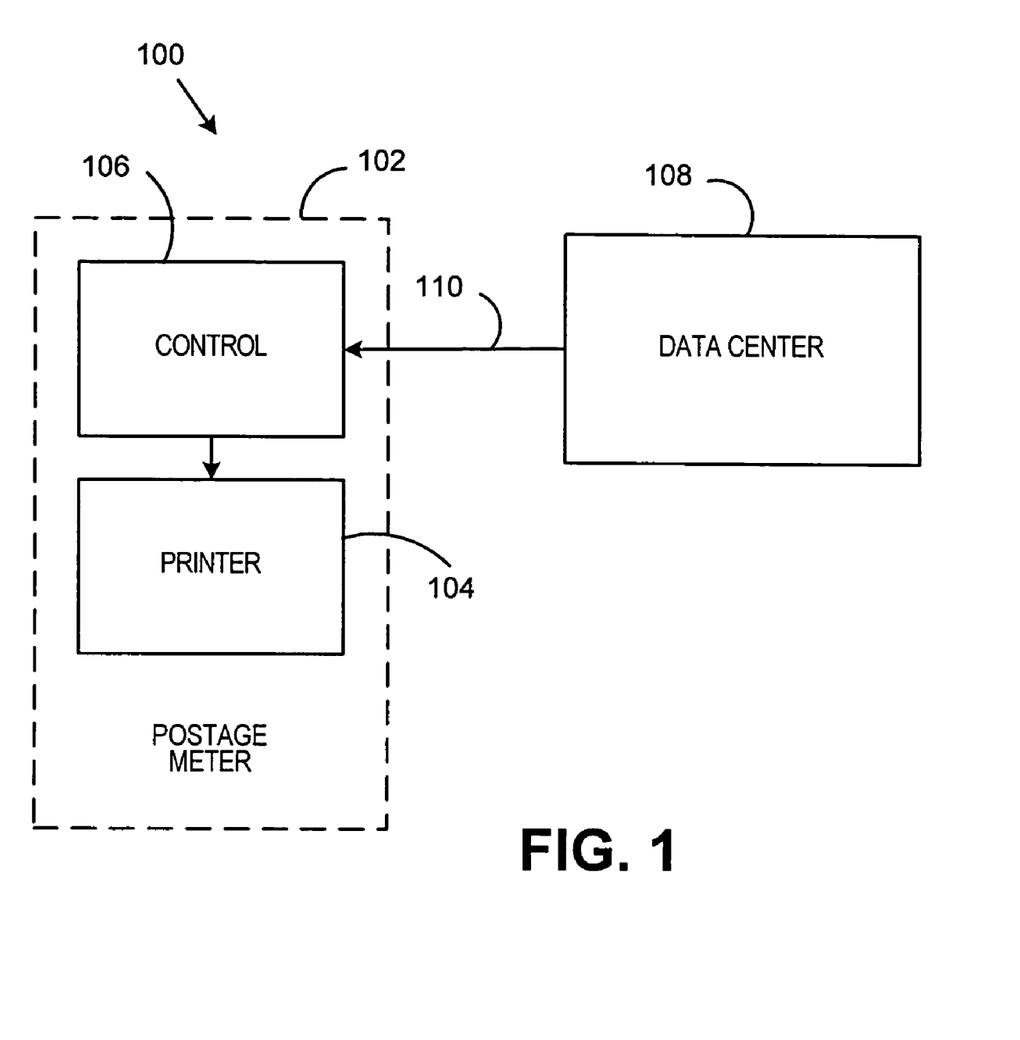
FIG. 1 is a block diagram that illustrates an apparatus provided in accordance with the invention for printing a watermarked image as part of a postage indicia.

Referring now to the drawings, and particularly to FIG. 1, the reference numeral 100 indicates generally an apparatus for printing watermarked images in accordance with principles of the present invention. The printing apparatus 100 includes a postage meter 102. The postage meter 102, in turn, includes a printer 104 and control circuitry 106 that is coupled to, and controls operation of, the printer 104. (Although embodiments of the present invention are described herein in the context of postage metering, those who are skilled in the art will recognize that the methods of the invention may also be applied to production and verification of other types of secure documents, including paper currency, travel and event tickets, and identification documents.) The printer 104 may be of a type that is capable of printing gray scale images or color images. For example, the printer 104 may include a dye-sublimation printer. In some embodiments, the printer may be capable of printing 256 gray levels.

The printing apparatus 100 also includes a data center 108 that is in communication with the control circuitry 106 of the postage meter 102 via a data communication channel 110. The data center 108 may generate a watermarked image in accordance with the invention, and may download to the postage meter 102 image data which represents the watermarked image. Using the downloaded image data, the postage meter 102 may print the watermarked image as a part of postage meter indicia applied to mail pieces, which are not shown. Thus the mail pieces, and particularly the postage meter indicia thereon, may constitute original documents which a postal authority may wish to verify.

Figure 2:
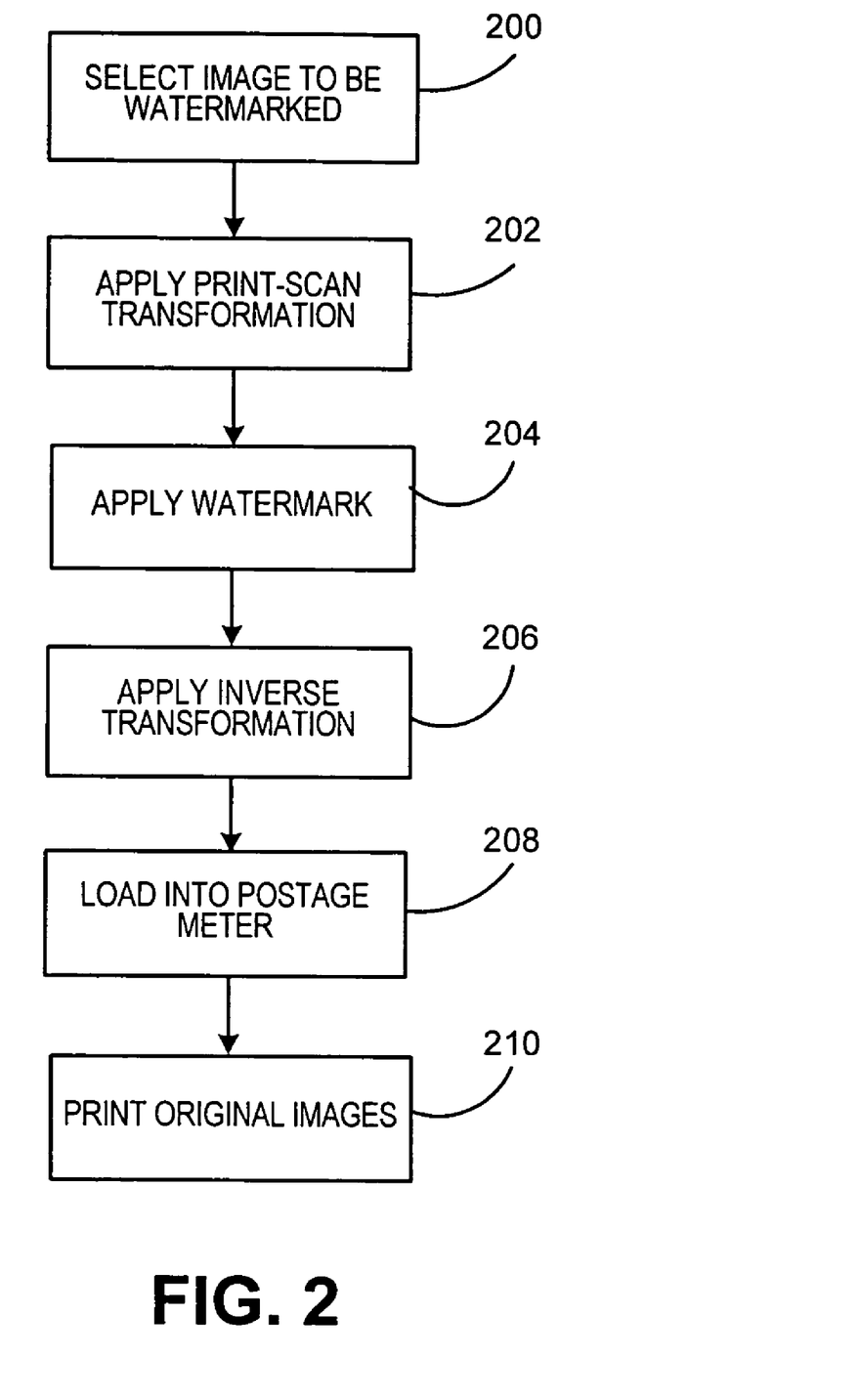
FIG. 2 is a flow chart that illustrates a process that may be provided in accordance with the invention for generating and printing watermarked images.

FIG. 2 is a flow chart that illustrates a process performed in accordance with the invention in the printing apparatus 100 of FIG. 1.

Initially, at step 200, an image is selected for watermarking. In some embodiments the image may be a standard image that is required to be printed as part of every postage meter indicia by every postage meter, or by every postage meter that is part of a program for incorporating a gray scale image in postage meter indicia. In other embodiments, the image may be one of a number of standard indicia, any one of which may be selected by the lessor of a postage meter as the image to be incorporated in indicia to be printed by the particular postage meter. In still other embodiments, the image may be a gray scale image that is chosen by the lessor of the postage meter from among images available for purchase or licensing, or may be generated by the lessor of the postage meter. In these cases the selected image may be sent by the lessor of the postage meter to the data center for watermarking so that the image can be incorporated in indicia to be printed by the particular postage meter. An image other than a gray scale image may alternatively be used.

In some embodiments, the image to be watermarked may be represented by pixel data that represents, with respect to each pixel of the image, a gray scale level. The number of available gray scale levels may be 256, in some embodiments. In such embodiments, each pixel may be represented by one 8-bit byte of image data, and the value of each pixel may be an integer n, with n greater than or equal to zero and less than or equal to 255. Each value of n may correspond to a different gray scale level; in some embodiments the zero value corresponds to black, the value 255 corresponds to white (no tone), and each value of n corresponds to a tone which is darker than the tone which corresponds to n plus one.

Figure 3:
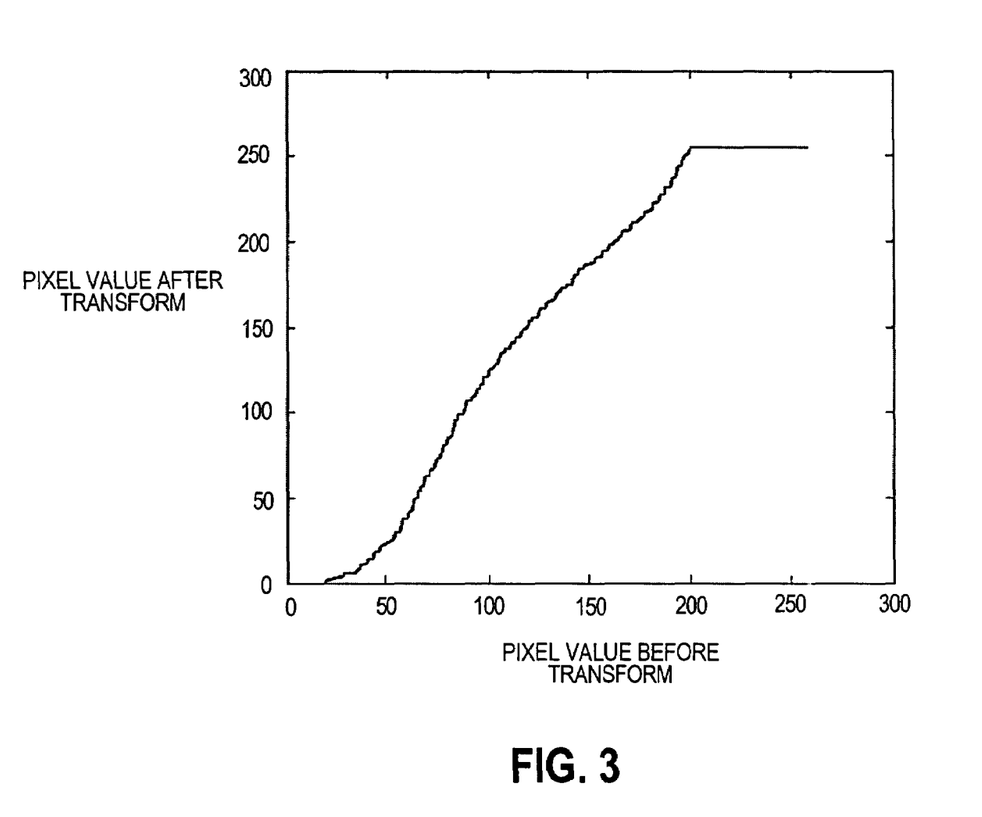
FIG. 3 is a graph that illustrates a transformation that may be applied to pixel values of an image to simulate changes in pixel values that may result from printing an image using the pixel values and then scanning the printed image.

Following step 200 is step 202. At step 202 a transformation may be applied to the image data which corresponds to the image. The transformation may substantially approximate the effect on pixel values of first printing the image with the type of printer employed in the postage meter, and then scanning the resulting image with a scanner of the type which is to be employed to verify the postage indicia. That is, the transformation applied at step 202 may be a print-scan distortion transformation. FIG. 3 is a graph that illustrates an example of the transformation that may be applied at step 202. In the graph of FIG. 3, the horizontal axis corresponds to pixel values prior to transformation, and the vertical axis corresponds to pixel values to which the prior values are mapped by the transformation.

The data illustrated in FIG. 3, or similar data for other printing and scanning equipment, may be generated according to the following procedure. First, image data may be generated that corresponds to a strip of gray scale blocks, each block corresponding to a respective gray scale level, and the strip as a whole representing a sequence of gray scale levels that spans the interval from white to black. A printed image is then produced on the basis of the image data and using a printer of the same type as the printer 104 of the postage meter 102 (or, as the case may be, with a printer of the type with which watermarked images are to be printed). The printed image is then scanned with a scanner of the type to be used in verifying or authenticating the watermarked printed images, and the pixel values corresponding to each gray scale block of the printed image are correlated with the gray scale values in original gray scale image data. With suitable interpolation, if appropriate, the correlation of the gray scale levels in the scanned image data with the gray scale levels in the original image data may be used to generate a mapping such as that illustrated in FIG. 3.

As an alternative to the empirical mapping of gray scale values via results obtained from operation of a print-scan channel, other models of the print-scan channel may be devised. For example, the print-scan channel may be modeled as a linear spatial filter, or as a non-linear spatial filter, and such a filter may be applied at step 202 to the image data resulting from step 200.

Step 204 follows step 202 in FIG. 2. At step 204 a watermark is applied to the image selected at step 200, as transformed at step 202. In some embodiments, the watermark applied at step 204 may be made by block-wise adjustments in the tone (average gray scale level) in the transformed image data, in a manner described in co-pending, commonly-assigned patent application, which is filed contemporaneously herewith and is entitled: "Fragile Watermark for Detecting Printed Image Copies". This co-pending patent application is hereby incorporated herein by reference in its entirety.

Alternatively, another type of watermark may be applied at step 204. For example, the watermark applied at step 204 may be a phase-space encoded watermark of the type described in co-pending, commonly-assigned patent application, which is filed contemporaneously herewith and is entitled: "Detecting Printed Image Copies Using Phase-Space Encoded Fragile Watermark". This co-pending patent application is hereby incorporated herein by reference in its entirety. Another type of watermark may alternatively be used, including for example any of a wide variety of conventional watermarks. As one example, there may be applied at step 204 the DFT-based watermark described in "Watermarking and Digital Signature Techniques for Multimedia Authentication and Copyright Protection" by Ching-Yung Lin (Ph.D. thesis submitted to Columbia University, 2000). In general, the watermark applied at step 204 may be a "fragile" watermark, as described in the above-referenced co-pending patent applications, or may be a "robust" watermark. Moreover, more than one watermark may be applied at step 204, and the watermarks applied may include both a fragile watermark and a robust watermark.

Both the original data that represents the image to be watermarked and the watermark data itself may be gray scale data. Alternatively, one or both of the original image data and the watermark data may include color information, so that the resulting watermarked image may be at least partially in color.

Figure 4:
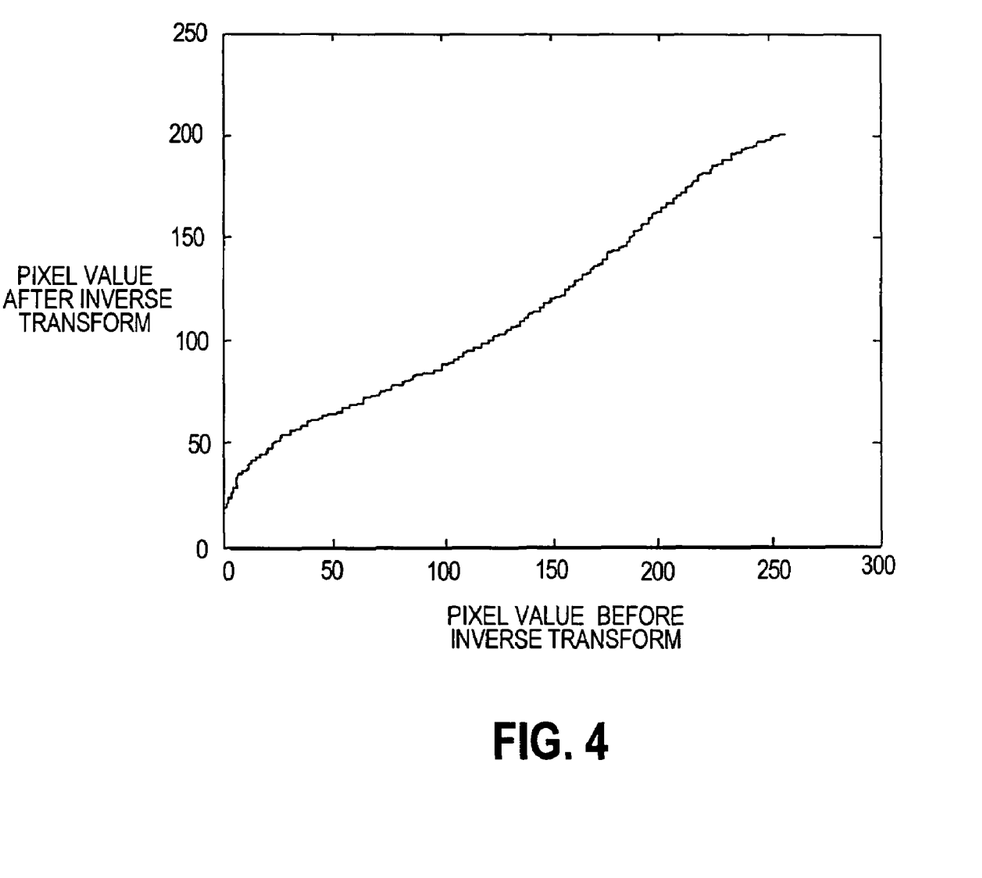
FIG. 4 is a graph that illustrates a transformation that is substantially the inverse of the transformation illustrated in FIG. 3.

Step 206 of FIG. 2 then follows. At step 206, the watermarked image is subjected to a transformation that is substantially or approximately the inverse of the print-scan distortion transformation that was applied at step 202. Where the print-scan distortion transformation was in the form of a mapping of gray scales, the inverse transformation can be readily derived from the forward direction transformation. FIG. 4 is a graph that illustrates an example of the inverse transformation that may be applied at step 206. In the graph of FIG. 4, the horizontal axis corresponds to pixel values prior to the inverse transformation of step 206, and the vertical axis corresponds to pixel values to which the prior values are mapped by the transformation.

If the print-scan distortion transformation that was applied at step 202 took the form of a linear spatial filter, an inverse of that filter is applied at step 206. Determining an inverse of a linear filter can be done in a straight-forward manner and need not be described further. If the print-scan distortion transformation that was applied at step 202 took the form of a non-linear spatial filter, in some cases an inverse filter to be applied at step 206 can be readily derived from the forward direction filter; in other cases considerable experimentation may be required to develop a satisfactory inverse direction filter that substantially inverts the forward direction filter. It may be preferable not to use at step 202 a nonlinear filter for which no inverse direction filter can be derived. However, in alternatives to the embodiments illustrated in FIGS. 5 and 8, it may not be necessary to provide an inverse transformation. For example, in the case of the embodiment of FIG. 5, it may be possible to develop a map from post print-scan to pre-print-scan gray scale levels by empirical experimentation.

With the completion of step 206, the watermarked image data is now in condition for use in printing images, and may be loaded into the postage meter 102 (FIG. 1), as indicated at step 208 in FIG. 2. For example, the watermarked image data may be downloaded from the data center 108 to the control circuitry 106 of the postage meter 102 via the data communication channel 110. Alternatively, the image data may be copied onto a floppy disk or other transportable data storage medium. The storage medium may then be mailed to the lessor of the postage meter and used to load the watermarked image data into the postage meter.

In any event, once the watermarked image data is present in the postage meter 102, the control circuitry 106 may control the printer 104 to print watermarked images (step 210, FIG. 2), based on the inverse-transformed watermarked image data, as part of postage meter indicia applied to mailpieces. In some embodiments, the image may be printed at a resolution of 200 gray scale dots (pixels) per inch.

In accordance with conventional practices, the postage meter indicia may include other information, including, e.g., postage amount, date, mailing location, postage meter serial number, two-dimensional barcode, etc. The data center may store data indicative of the watermark applied at step 204.

Figure 5:
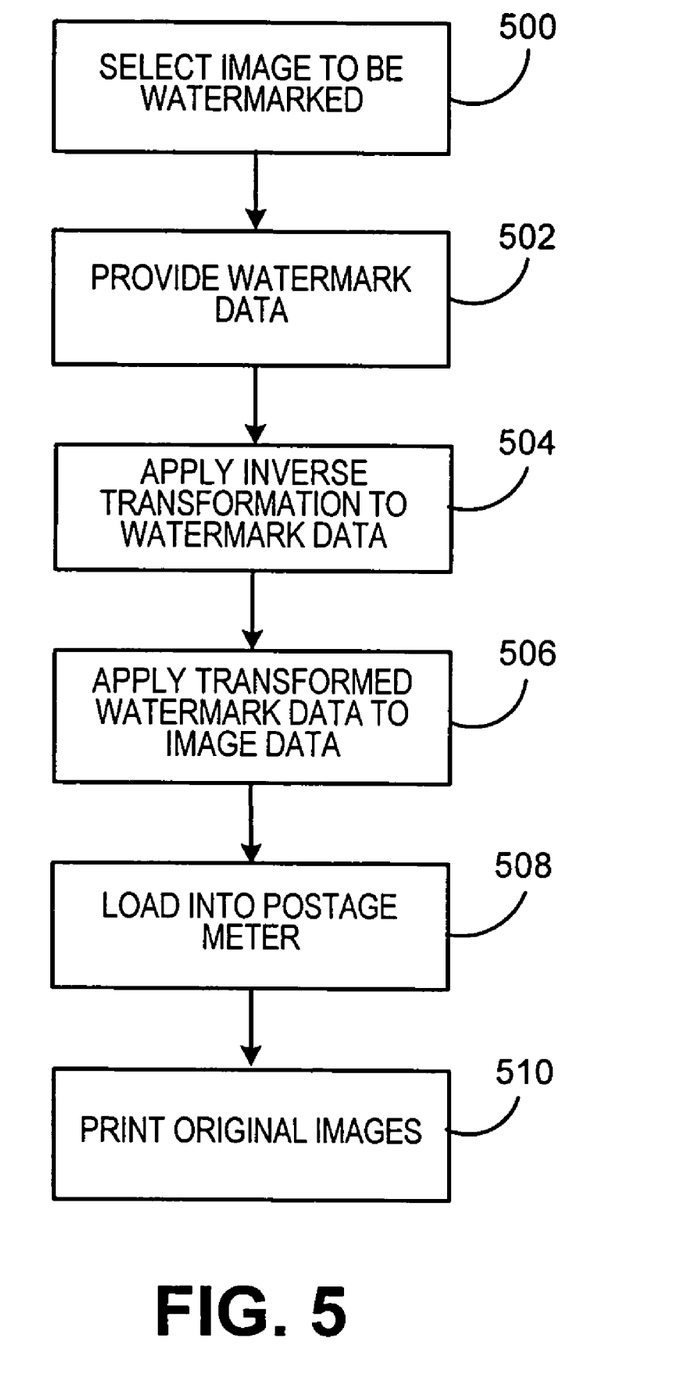
FIG. 5 is a flow chart that illustrates a process that may be provided in accordance with an alternative embodiment of the invention for generating and printing watermarked images.

FIG. 5 is a flow chart that illustrates a process that may be provided in accordance with an alternative embodiment of the invention for generating and printing watermarked images. The process illustrated in FIG. 5 may be particularly suitable in the case where a watermark to be applied consists of data to be combined additively to the original image data, or in other cases in which application of the watermark is independent of the content of the original image data. One example of such an independently applicable watermark is the phase-space encoded watermark described in the above-referenced co-pending patent application. The process of FIG. 5 may, for example, be performed by a suitably programmed version of the apparatus of FIG. 1.

Initially, at step 500 in FIG. 5, an image is selected for watermarking. This may be done in the same manner as described above in connection with step 200 in FIG. 2. Next, at step 502, there is provided and/or generated watermark data that represents the watermark to be combined with the selected image. Then, at step 504, a transformation is applied to the watermark data that is available as a result of step 502. The transformation applied at step 504 is approximately or substantially the inverse of a print-scan distortion transformation that approximates the distortion expected to result from printing the watermarked image and then scanning the resulting printed image. Derivation of a suitable inverse transformation to be used in step 504 may be performed in the same manner as was described above in connection with step 206 of FIG. 2.

Following step 504 is step 506. At step 506, the inverse-transformed watermark data resulting from step 504 is combined with original image data that represents the image selected at step 500. Step 506 may include, for example, adding the original image data and the inverse-transformed watermark data. The result of step 506 is watermarked digital image data that is ready for printing.

As indicated at step 508, the watermarked digital image data may be loaded into the postage meter 102. This may be done, for example, in any of the ways described in connection with step 208 in FIG. 2. The postage meter 102 may then be employed, as indicated at step 510, to print postage meter indicia that include a printed image that represents the watermarked image data produced at step 506.

Figure 6:
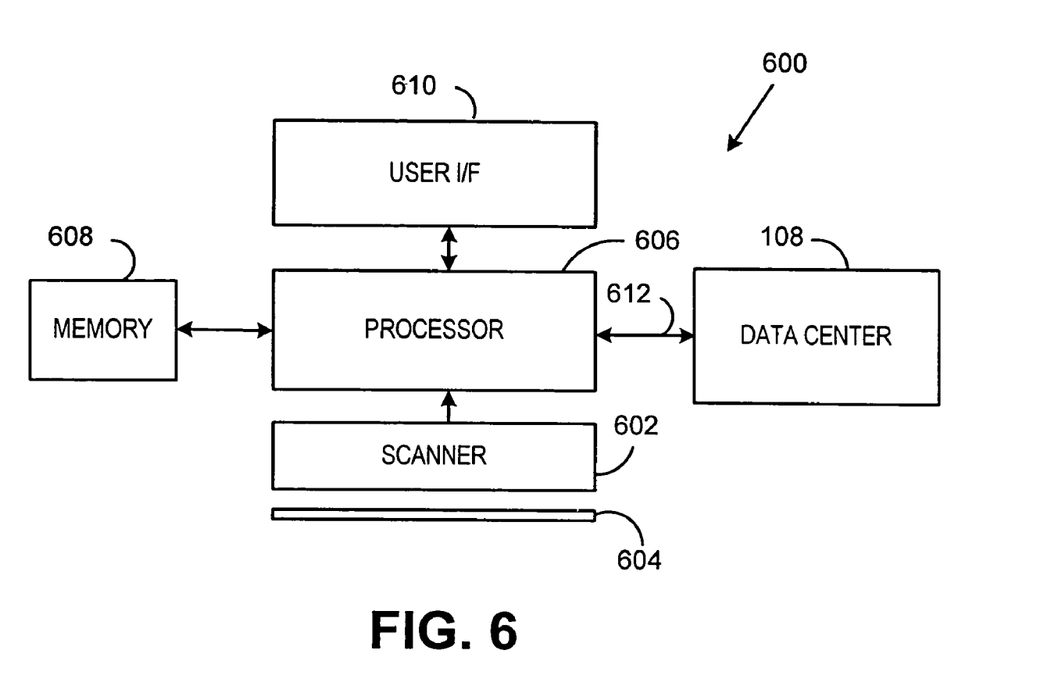
FIG. 6 is a block diagram of an apparatus that may be provided in accordance with the invention to examine printed images.

FIG. 6 is a block diagram of an image examination apparatus 600 that may be provided in accordance with the invention to examine printed images generated in accordance with the procedures of FIG. 2 or 5.

The image examination apparatus 600 may include a scanner 602 (e.g., a 600 dpi scanner) to scan a substrate 604 (e.g., a mail piece) to generate scanning image data that represents an image (not separately shown) carried on the substrate 604. The printed image scanned by the scanner 602 may be referred to as the "printed-image-under examination" or "PIUE".

The image examination apparatus 600 further includes a processor 606 that is coupled to the scanner 602. The processor 606 may process scanned image data generated by the scanner 602, and may store scanned image data in a memory 608 that is coupled to the processor 604. The memory 608 may serve as a program store and as working memory, as well as a scanned image data store.

The image examination apparatus 600 may further include a user interface 610 which is coupled to the processor 606 to allow an operator of the apparatus to provide input to the processor and to receive output from the processor. In addition, the processor 606 may be temporarily or permanently coupled to a data center (which may be the data center 108 of FIG. 1) via a data communication channel 612.

Figure 7:
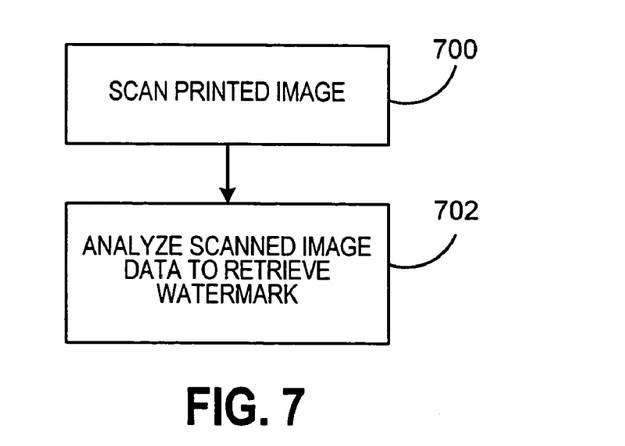
FIG. 7 is a flow chart that illustrates a process that may be provided in accordance with the invention to retrieve a watermark in a printed image.

FIG. 7 is a flow chart that illustrates a process that may be performed in accordance with the invention by the image examination apparatus 600 of FIG. 6 to examine a PIUE.

According to a first step 700 in the process of FIG. 7, the apparatus 600 scans the PIUE via the scanner 602 to generate scanned image data. The scanned image data is made up of pixel data that may be constituted by gray scale values and represents the PIUE as a set of scanning pixels. The scanned image data may be pre-processed by the processor 606 and/or stored in the memory 608.

Next is step 702, at which the processor 606 analyzes the scanned image data produced at step 700 to retrieve the watermark that was incorporated in the PIUE and/or to determine a characteristic of the watermark as it passed through the print-scan channel. For example, in some embodiments, if the watermark was a "fragile" watermark, a characteristic of the watermark as retrieved from the scanned image data may be compared with a characteristic of the original watermark data that was combined with the original (or forward direction transformed) image data. If the watermark as retrieved from the scanned image data differs by less than a threshold amount from the original watermark data, then the apparatus 600 may determine that the PIUE is an original document (e.g., a legitimate postage meter indicia). If the watermark as retrieved from the scanned image data differs from the original watermark data by more than the threshold amount, then the apparatus 600 may determine that the PIUE is a copy of an original document (e.g., a fraudulent copy of a postage meter indicia).

The present inventor has found that the compensation for print-scan channel distortion that may be provided by the present invention may enhance the detectable differences between a fragile watermark in an original document and the fragile watermark as reproduced in a copy of an original document.

In one experiment, the above-referenced tonal fragile watermark (described in above-referenced co-pending patent application was applied to image data after the image data was transformed in accordance with a print-scan distortion transformation. The resulting transformed image data was then watermarked with the tonal watermark and the watermarked image data was then subjected to a second transformation that was substantially the inverse of the print scan distortion transformation. The inverse transformed watermarked image data was used to print an original image with a resolution of 200 dpi. The original image was scanned at 600 dpi and the tonal watermark was retrieved from the scanned image data to determine a metric indicative of the difference between the watermark as retrieved from the scanned image data and the watermark as originally applied to the forward direction transformed original image data. In this case the print-scan transformation mapping was derived empirically by transmitting a strip of gray scale blocks through the print-scan channel.

The original printed image was also scanned at 1200 dpi to produce second scanned image data, and a copy of the original printed image was created by printing at 1200 dpi from the second scanned image data to simulate a high-quality copying attack on the original printed image. The copy printed image was then scanned at 600 dpi and subjected to the same watermark detection procedure to generate the metric with respect to the copy printed image to indicate the difference between the watermark as retrieved from the scanned copy image and the watermark as originally applied to the forward direction transformed original image data.

In a control procedure, the forward direction and inverse transformation steps were omitted and the corresponding metrics were obtained for the resulting original and copy printed images. The difference between the respective metrics for the original and the copy was considerably less in the control procedure than when the forward direction and inverse transformation steps were used. Thus the inverse transformation may have enhanced the ability of the procedure to distinguish between original documents and copies by pre-compensating for distortion to the watermark data caused by transmission through the print-scan channel.

In some embodiments, if the watermark is applicable to the image data independently of the content of the image data, the process of FIG. 2 may be modified by dropping step 202. Alternatively, as noted above, the process of FIG. 5 may be employed.

Figure 8:
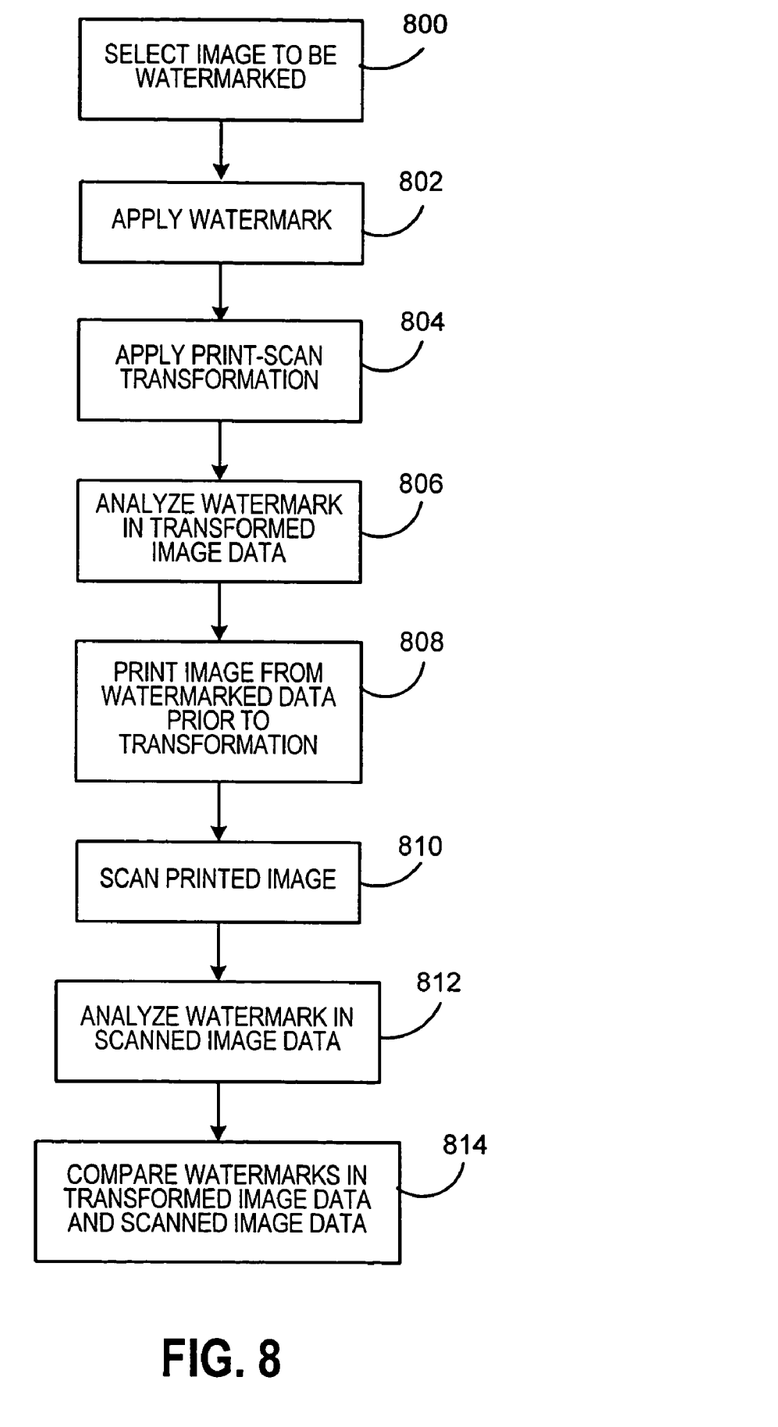
FIG. 8 is a flow chart that illustrates a process that may be provided in accordance with another alternative embodiment of the invention.

FIG. 8 is a flow chart that illustrates a process that may be provided in accordance with another alternative embodiment of the invention. Initially in FIG. 8, as indicated by step 800, an image to be watermarked is selected. This may be done in the same manner as described above in connection with step 200 of FIG. 2. Next, as indicated in step 802 of FIG. 8, a watermark is applied to image data that represents the selected image. Then, at step 804, a print-scan distortion transformation is applied to the watermarked image data produced at step 802. At step 806, the transformed watermarked image data produced at step 804 is analyzed to retrieve a characteristic of the watermark as represented by the transformed watermarked image data. Data indicative of the retrieved characteristic may be stored for future reference.

As indicated in step 808, an original printed image may be generated by using the watermarked image data produced at step 802 (i.e., the printed image is produced by the image data as it existed prior to print-scan distortion transformation). Then, at step 810, the original image (or a PIUE not known to be original) may be scanned to produce scanned image data. At 812, the scanned image data produced at step 810 is analyzed to retrieve a characteristic of the watermark as represented by the scanned image data. As indicated by step 814, the results of steps 806 and 812 may be compared to, e.g., authenticate the image scanned at step 810.

The process of FIG. 8 may be particularly helpful in the case of a print-scan distortion transformation model for which the inverse transformation is computationally intensive or for which no inverse transformation can be derived. The process of FIG. 8 may, for example, be performed using suitably programmed versions of the apparatus of FIGS. 1 and 6.

In another application of the print-scan or inverse print-scan transformations described herein, it may be possible to analyze a printed image to determine whether the image was printed or scanned with a printer or scanner other than an expected or standard printer or scanner.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. The present invention may be applied, for example, to verification of documents other than postage indicia. Other variations relating to implementation of the functions described herein can also be implemented. Accordingly, other embodiments are within the scope of the following claims.

What is claimed is:

1. a method comprising:
   (a) providing digital image data that represents an image;
   (b) applying a digital watermark to the digital image data to produce watermarked digital image data;
   (c) applying a print-scan distortion transformation wherein the print-scan transformation approximates the effect of printing and scanning on pixel values of the watermarks digital image data to the watermarked digital image data to produce transformed watermarked digital image data that improves the quality of the digital image data to be printed;
   (d) retrieving a characteristic of the watermark as represented by the transformed watermarked digital image data produced at step (c);
   (e) printing an image on the basis of the watermarked digital image data produced at step (b);
   (f) scanning the printed image to produce scanned image data;
   (g) retrieving a characteristic of the watermark as represented by the scanned image dab produced at step (f); and
   (h) comparing the characteristic retrieved at step (d) with the characteristic retrieved at step (g).

2. The method according to claim 1, further comprising: loading the water digital image data into a postage meter.

3. The method according to claim 2, further comprising; using the postage meter to print a postage indicia on a mail piece, the postage meter indicia including a printed image based on the watermarked digital image data.

* * * * *